(12) United States Patent
Yang et al.

(10) Patent No.: US 12,236,812 B2
(45) Date of Patent: Feb. 25, 2025

(54) THREE-DIMENSIONAL DISPLAY DEVICE AND DRIVING METHOD AND MANUFACTURING METHOD THEREFOR

(71) Applicant: BOE Technology Group Co., Ltd., Beijing (CN)

(72) Inventors: Junxing Yang, Beijing (CN); Chunmiao Zhou, Beijing (CN); Jinye Zhu, Beijing (CN); Sen Ma, Beijing (CN); Jing Yu, Beijing (CN); Tianyang Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/754,545

(22) PCT Filed: Jan. 25, 2021

(86) PCT No.: PCT/CN2021/073652
§ 371 (c)(1),
(2) Date: Apr. 5, 2022

(87) PCT Pub. No.: WO2021/175046
PCT Pub. Date: Sep. 10, 2021

(65) Prior Publication Data
US 2024/0062689 A1    Feb. 22, 2024

(30) Foreign Application Priority Data
Mar. 6, 2020   (CN) .......................... 202010153032.0

(51) Int. Cl.
*G09G 3/00*       (2006.01)
*G02B 30/29*     (2020.01)
(Continued)

(52) U.S. Cl.
CPC ............. *G09G 3/001* (2013.01); *G02B 30/29* (2020.01); *G02B 30/30* (2020.01); *G02B 30/32* (2020.01);
(Continued)

(58) Field of Classification Search
CPC ........ G02B 30/29; G02B 30/30; G02B 30/32; G06F 3/013; G09G 3/001;
(Continued)

(56) References Cited

U.S. PATENT DOCUMENTS

2009/0015738 A1    1/2009  Hong et al.
2009/0262418 A1*  10/2009  Yun ........................ G02B 30/29
                                                                    348/59
2019/0377177 A1   12/2019  Takahashi et al.

FOREIGN PATENT DOCUMENTS

CN         101344642 A        1/2009
CN         202975533 U    *   6/2013
(Continued)

OTHER PUBLICATIONS

Yu, "Key Technologies of High-Resolution, Dense Viewpoint 3D Display", evanescent, Full Database Information Technology Series of Chinese PhD thesis, No. 2, 2018, Feb. 15, 2018) (Year: 2018).*
(Continued)

*Primary Examiner* — Nitin Patel
*Assistant Examiner* — Cory A Almeida
(74) *Attorney, Agent, or Firm* — Workman Nydegger

(57) ABSTRACT

The present disclosure provides a three-dimensional display device, a driving method and manufacturing method therefor. The three-dimensional display device comprises: a display panel having a plurality of pixels sequentially arranged in row direction and column direction; a light splitting assembly located on the display side of the display panel and having a plurality of light splitting structures, the plurality of
(Continued)

light splitting structures being arranged parallel to each other and sequentially arranged in row direction, wherein pixels covered by at least one light splitting structure are divided into at least one pixel repeating unit, and the at least one pixel repeating unit is sequentially arranged along an extension direction of the light splitting structure; light emitted by pixels at the same position in all of the pixel repeating units forms a viewpoint through respective corresponding light splitting structures; the width of each light splitting structure in row direction is D; each pixel repeating unit comprises at least two rows of pixels, and each row of pixels comprises $N_1$ pixels, and aa; wherein L is the vertical distance from a human eye observation point to a light splitting structure, h is the vertical distance from the pixel to the light splitting structure, and Px is the size of the pixel in row direction.

20 Claims, 14 Drawing Sheets

(51) Int. Cl.
| | | |
|---|---|---|
| *G02B 30/30* | (2020.01) | |
| *G02B 30/32* | (2020.01) | |
| *G06F 3/01* | (2006.01) | |
| *H04N 13/305* | (2018.01) | |
| *H04N 13/317* | (2018.01) | |
| *H04N 13/324* | (2018.01) | |
| *H04N 13/351* | (2018.01) | |

(52) U.S. Cl.
CPC ........... *G06F 3/013* (2013.01); *H04N 13/305* (2018.05); *H04N 13/317* (2018.05); *H04N 13/324* (2018.05); *H04N 13/351* (2018.05); *G09G 3/003* (2013.01); *G09G 2300/0452* (2013.01); *G09G 2320/0209* (2013.01); *G09G 2320/0242* (2013.01); *G09G 2320/028* (2013.01); *G09G 2354/00* (2013.01)

(58) Field of Classification Search
CPC ... G09G 2300/0452; G09G 2320/0209; G09G 2320/0242; G09G 2320/028; G09G 2354/00; G09G 3/003; H04N 13/305; H04N 13/317; H04N 13/324; H04N 13/351
See application file for complete search history.

(56) References Cited

FOREIGN PATENT DOCUMENTS

| | | | |
|---|---|---|---|
| CN | 103686117 A | * | 3/2014 |
| CN | 104950461 A | | 9/2015 |
| CN | 105911712 A | | 8/2016 |
| CN | 106131542 A | * | 11/2016 |
| CN | 111323935 A | | 6/2020 |

OTHER PUBLICATIONS

Chinese Office Action, mailed Feb. 9, 2021, from Chinese Application No. 202010153032.0.

Chinese Decision of Rejection, mailed Aug. 25, 2021, from Chinese Application No. 202010153032.0.

Yu, Xunbo, "Key Technologies of High-resolution, Dense Viewpoint 3D Display", Beijing University of Posts and Telecommuncations Doctoral dissertation, Apr. 10, 2016.

* cited by examiner

THREE-DIMENSIONAL DISPLAY DEVICE AND DRIVING METHOD AND MANUFACTURING METHOD THEREFOR

CROSS REFERENCE TO RELATED APPLICATIONS

The present disclosure is a National Stage of International Application No. PCT/CN2021/073652, filed on Jan. 25, 2021, which claims priority to the Chinese Patent Application No. 202010153032.0, filed to the China Patent Office on Mar. 6, 2020 and entitled "N-VIEWPOINT THREE-DIMENSIONAL DISPLAY DEVICE AND DRIVING METHOD THEREFOR", the entire contents of which are incorporated herein by reference.

FIELD

The present disclosure relates to the technical field of display, in particular to a three-dimensional display device and a driving method and manufacturing method therefor.

BACKGROUND

With increasing development of a display technology, a three-dimensional (3D) display technology is increasingly of great interest. The 3D display technology can make a display image stereo and vivid. Its principle lies in: a left-eye image and a right-eye image which have a certain parallax are received through a left eye and a right eye of a human body respectively, and image information is overlaid and fused through a brain after the two parallax images are received by the left eye and the right eye of the human body respectively so that a 3D visual display effect can be established.

SUMMARY

In one aspect, an embodiment of the present disclosure provides a three-dimensional display device, including:
  a display panel, including a plurality of pixels sequentially arranged in a row direction and a column direction; and
  a light splitting assembly, arranged on a display side of the display panel and including a plurality of light splitting structures, the light splitting structures are parallel to each other and sequentially arranged in the row direction;
  pixels of the display panel covered by at least one of the light splitting structures are divided into at least one pixel repeating unit, the at least one pixel repeating unit is sequentially arranged along an extension direction of the at least one of the light splitting structures, light emitted by pixels at a same position in all of the pixel repeating units forms a viewpoint through respective corresponding light splitting structures, a width, in the row direction, of an orthographic projection of each of the light splitting structures on a plane where the display panel is located is D, each of the pixel repeating units includes at least two rows of pixels, each row of pixels includes $N_1$ pixels, and $N_1$ and D meet the following formula:

$$N_1 = \frac{D \times (L+h)}{L \times P_X},$$

wherein L is a vertical distance from a human eye observation point to the light splitting structure, h is a vertical distance from a pixel to the light splitting structure, and Px is a size of the pixel in the row direction.

In some embodiments, light-emitting colors of the pixels at the same viewpoint in three of the pixel repeating units continuously arranged in the extension direction of the light splitting structure are different.

In some embodiments, each of the pixel repeating units includes $N_2$ rows of pixels, and $N_2$ meets the following formula:

$$0 \le N_2 \le \frac{w}{k},$$

wherein w is an interval between two viewpoints formed by light of two adjacent pixels in the row direction in the pixel repeating unit through the corresponding light splitting structures, the interval w is smaller than a distance between two eyeballs of the human body and w≤32.5 mm; k is a viewpoint density to be reached, in the present solution, in order to guarantee a motion parallax of smooth watching of 3D motion, the viewpoint density refers to a distance between two adjacent viewpoints, and in multi-view naked eye 3D display, k≤10 mm; and the total quantity of viewpoints of the three-dimensional display device is N, and $N=N_1 \times N_2$.

In some embodiments, the width D, in the row direction, of the orthographic projection of each of the light splitting structures on the plane where the display panel is located meets the following formula:

$$D \le 2L \times \tan\left(\frac{\pi}{180} \times \frac{1}{60} \times \frac{1}{2}\right).$$

In some embodiments, the width D, in the row direction, of the orthographic projection of each of the light splitting structures on the plane where the display panel is located meets the following formula:

$$D \ge \frac{hQ}{L},$$

wherein Q is a minimum viewable width which the three-dimensional display device will reach.

In some embodiments, a ratio of the width D, in the row direction, of the orthographic projection of each of the light splitting structures to the vertical distance h from the pixel to the light splitting structure is in a range of 0.1-0.5.

In some embodiments, the plurality of light splitting structures extend in a direction forming an acute angle with the column direction.

In some embodiments, an included angle θ is formed between the extension direction of the light splitting structures and the column direction and meets the following formula:

$$\tan\theta = \frac{M}{N_2 \times K},$$

wherein K is a ratio of a size of the pixel in the column direction to the size of the pixel in the row direction, M≥1, M is an integer, and a greatest common divisor of M and $N_2$ is 1.

In some embodiments, 5°≤θ≤16°.

In some embodiments, the K is 3, wherein $N_1$ is 14, $N_2$ is 2, and θ is 9.46°; or $N_1$ is 9, $N_2$ is 3, and θ is 15.5°; or $N_1$ is 8, $N_2$ is 2, and θ is 9.46°.

In some embodiments, each row of pixels in the same pixel repeating unit are staggered by a length of one pixel in sequence in the row direction; in response to $N_2$ being 2, adjacent rows of pixels in two pixel repeating units continuously arranged in the extension direction within each of the light splitting structures are aligned in the column direction; and in response to $N_2$ being 3, the adjacent rows of pixels in the $2n^{th}$ pixel repeating unit and $2n-1^{th}$ pixel repeating unit in the extension direction within each of the light splitting structures are staggered by a length of one pixel in the row direction, the adjacent rows of pixels in the $2n^{th}$ pixel repeating unit and $2n+1^{th}$ pixel repeating unit are aligned in the column direction, n≥1, and n is an integer.

In some embodiments, the light splitting structures are configured to make viewpoints formed by the light emitted by all the pixels in the pixel repeating units covered by the light splitting structures be sequentially arranged in the row direction in space.

In some embodiments, each of the light splitting structures is a cylindrical lens.

In some embodiments, the light splitting assembly includes a plurality of light blocking strips and a plurality of light transmitting strips, the light blocking strips and the light transmitting strips are arranged alternately in sequence in the row direction;

each of the light splitting structures includes one light transmitting strip and two halves of light blocking strip, the two halves of light blocking strip are located on two sides of the light transmitting strip.

In some embodiments, a width a of the light transmitting strip in the row direction meets the following formula:

$$a = \frac{w \times P_X}{w + P_X}.$$

In some embodiments, each of the plurality of pixels is a sub-pixel, and the plurality of pixels include: red sub-pixels, green sub-pixels and blue sub-pixels, the red sub-pixels, the green sub-pixels and the blue sub-pixels are arranged circularly in sequence in the row direction.

In some embodiments, the pixels covered by the two adjacent light splitting structures include a first partition and a second partition, wherein the first partition is covered by one of the two light splitting structures, the second partition is covered by the other light splitting structure, and an area of the first partition is smaller than an area of the second partition;

the display panel further includes a black matrix, and the black matrix covers the first partition and does not overlap with the second partition.

In another aspect, an embodiment of the present disclosure further provides a driving method for the above three-dimensional display device, including:

determining an image driving signal corresponding to each viewpoint according to an image information; and applying the image driving signal corresponding to the same viewpoint to pixel at the same position in different pixel repeating units so as to form a three-dimensional image having a plurality of viewpoints, and a horizontal interval w is formed between viewpoints to which two adjacent pixels in the row direction in each pixel repeating unit correspond and meets the following formula:

$$w = \frac{E}{n},$$

wherein E is a distance between two eyeballs of a human body, and n≥2.

In some embodiments, three pixels of different light-emitting colors at the same viewpoint in three pixel repeating units continuously arranged along an extension direction within each of light splitting structures serve as a three-dimensional image driving unit to perform color fusion so as to form a multi-view three-dimensional image without a color shift.

In another aspect, an embodiment of the present disclosure further provides a manufacturing method for the above three-dimensional display device, including:

manufacturing a light splitting assembly having a plurality of light splitting structures and a display panel having a plurality of pixels sequentially arranged in a row direction and a column direction;

placing the light splitting assembly vertically along an extension direction of each of the light splitting structures, cutting the light splitting assembly according to a preset size respectively in directions forming a first included angle and a second included angle with a horizontal direction so as to obtain the plurality of light splitting structures arranged in the horizontal direction and forming the first included angle with a vertical direction, wherein a sum of the first included angle and the second included angle is 90°; and laying the plurality of light splitting structures on a display side of the display panel so as to obtain the three-dimensional display device.

In some embodiments, the manufacturing the light splitting assembly including the plurality of light splitting structures includes:

forming a first resin layer on a substrate;

forming a plurality of cylindrical lenses on the first resin layer in a reel-to-reel nano-imprinting mode; and forming a second resin layer on the plurality of cylindrical lenses, wherein a thickness of the second resin layer is greater than an arch height of each of the cylindrical lenses in a direction perpendicular to the substrate.

In some embodiments, after placing the light splitting assembly vertically along the extension direction of each of the light splitting structures and before cutting the light splitting assembly according to the preset size respectively in the directions forming the first included angle and the second included angle with the horizontal direction, further includes:

adjusting alignment of a space glass and the light splitting structures so that the space glass and the light splitting structures are fixed after the space glass and the light splitting structures are placed in the second included angle;

laying the plurality of light splitting structures on the display side of the display panel specifically includes:

laying one side, with the space glass, of the plurality of light splitting structures on the display side of the display panel.

DETAILED DESCRIPTION OF THE EMBODIMENTS

Figure 1:
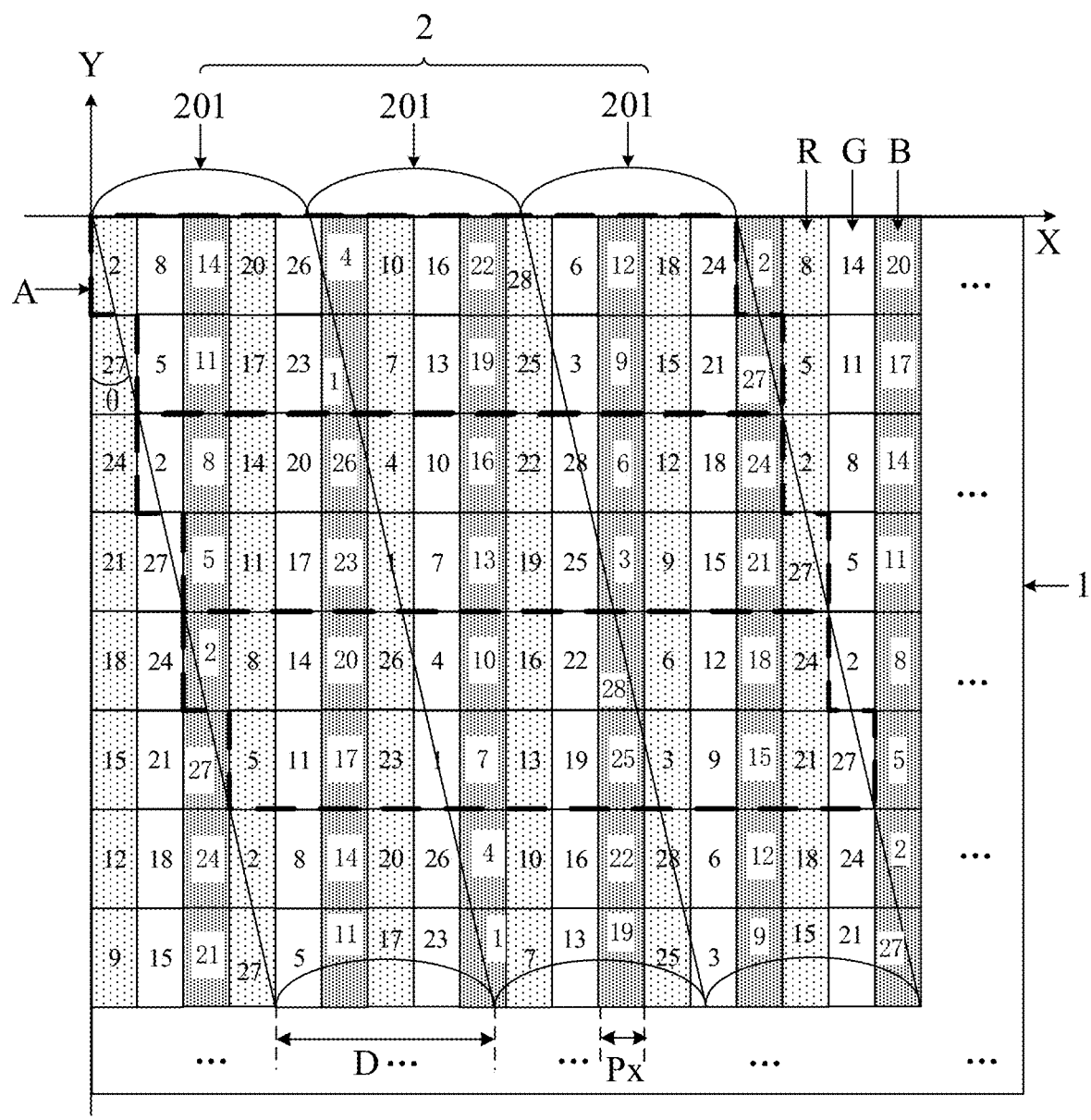
FIG. 1 is a schematic structural diagram of a three-dimensional display device provided by an embodiment of the present disclosure.

In order to make objectives, technical solutions and advantages of embodiments of the present disclosure clearer, the technical solutions of the embodiments of the present disclosure will be described clearly and completely below with reference to the drawings of the embodiments of the present disclosure. It needs to be noted that a size and a shape of each figure in the drawings do not reflect a true scale and only intend to illustrate contents of the present disclosure. The same or similar reference numbers represent the same or similar components or components with the same or similar functions all the time. Apparently, the described embodiments are some, but not all, of the embodiments of the present disclosure. All other embodiments obtained by those ordinarily skilled in the art without creative work on the basis of the described embodiments of the present disclosure fall within the protection scope of the present disclosure.

Unless otherwise defined, technical or scientific terms used herein should be commonly understood by those ordinarily skilled in the art of the present disclosure. "First", "second" and other similar words used in the specification and the claims of the present disclosure do not denote any sequence, quantity or significance and are only used for distinguishing different components. "Include" or "contain" or other similar words means that a component or an item preceding the word covers components or items and their equivalents listed after the word without excluding other components or items "Inner", "outer", "upper", "lower" and the like are only used for denoting a relative position relation, and when an absolute position of a described object changes, the relative position relation may change correspondingly.

A traditional parallax 3D display technology causes tendency to visual fatigue of a user due to problems of focusing and convergence, and consequently its application is greatly limited. A light field display technology may restore a light field by using a principle of geometrical optics and solves the problems of focusing and convergence existing in traditional 3D display, thereby being of increasing interest to people. However, there are still problems of low 3D resolution, insufficient depth of field and insufficient viewing angle due to limit of a size of a pixel and the quantity of pixels, etc., and consequently a display effect is affected.

A super multi-view (SMV) 3D display technology can improve a naked eye 3D display effect and better restore light field information so as to be greatly applied to some scenes such as exhibition display, advertising, medical education, etc.

However, with limit by a pixel density of a display panel 1, in order to avoid loss of a 2D resolution while a 3D resolution is improved, super multi-view display is realized usually in a mode of performing gain on viewpoints to which pixels correspond in a horizontal direction through viewpoints to which pixels correspond in a vertical direction, but this way may cause large crosstalk, and consequently a 3D image is poor in definition and less stereo.

Specific to the above problems in the related art, an embodiment of the present disclosure provides a three-dimensional display device, as shown in FIG. 1 to FIG. 4, which may include:

a display panel 1 including a plurality of pixels sequentially arranged in a row direction X and a column direction Y. In some embodiments, each of the pixels in the display panel 1 may be any one of a red sub-pixel R, a green sub-pixel G or a blue sub-pixel B. In some other embodiments, each of the pixels in the display panel 1 may also be any one of the red sub-pixel R, the green sub-pixel G, the blue sub-pixel B or a white sub-pixel W. Optionally, the display panel 1 may include an array substrate 101, a color film substrate 102 and a polarizer 103. Other essential components of the display panel 1 should be understood by those ordinarily skilled in the art, which will neither be repeated in detail herein nor supposed to limit the present disclosure. During specific implementation, a PPI liquid crystal display (LCD) panel or an organic light emitting diode (OLED) panel is preferred as the display panel 1 so as to better improve the 3D display resolution;

a light splitting assembly 2 is arranged on a display side of the display panel 1 and includes a plurality of light splitting structures 201 which are arranged parallel to each other and sequentially arranged in the row direction X.

Pixels of the display panel 1 covered by the at least one light splitting structure 201 are divided into at least one pixel repeating unit A, the at least one pixel repeating unit A is sequentially arranged along an extension direction of the light splitting structure 201, light emitted by pixels at the same position in all of the pixel repeating units A forms a viewpoint through respective corresponding light splitting structures 201, a width, in the row direction X, of an orthographic projection of each of the light splitting structures 201 on a plane where the display panel 1 is located is D, each pixel repeating unit A includes at least two rows of pixels, each row of pixels includes $N_1$ pixels, and $N_1$ and D meet the following formula:

$$N_1 = \frac{D \times (L+h)}{L \times P_X},$$

where L is a vertical distance from a human eye observation point to the light splitting structure 201 (for example, L may be 1 m to 3 m), h is a vertical distance from the pixel to the light splitting structure 201, and Px is a size of the pixel in the row direction. In some embodiments, space glass 3 may be arranged between the display panel 1 and the light splitting structures 201, and the space glass 3 and the light splitting assembly 2 are bonded and fixed through an optical clear adhesive 4. The space glass 3 is optical transparent glass with a refractive index being 1.5, an actual thickness of the space glass 3 is designed according to a whole device, and the thickness of the space glass 3 is generally 2 mm, 3 mm and 5 mm.

In the present disclosure, $N_1$ and D are set to meet the above formula so that the quantity $N_1$ of the pixels covered by each of the light splitting structures 201 in the row direction X can be increased. An interval between two viewpoints formed by light emitted by the two adjacent pixels in the row direction X in the display panel 1 through the light splitting structures 201 corresponding to the two adjacent pixels is w, and $$w = \frac{L \times P_X}{h},$$

it can be known by combining the two formulas that $$N_1 = \frac{D \times (L+h)}{w \times h},$$

namely, $N_1$ and w are in a negative correlation relation, therefore, compared with the related art, the interval w correspondingly decreases while $N_1$ increases, in this way, under the condition of reaching the same quantity of viewpoints and the same viewpoint density as the related art (for example, the viewpoint density is 10 mm), the quantity of pixels in the column direction Y can be reduced, that is, the quantity of viewpoints to which the pixels in the column direction Y correspond is also reduced, accordingly, when multi-view display is realized by performing gain on the viewpoints to which the pixels in the row direction X correspond through the viewpoints to which the pixels in the column direction Y correspond, crosstalk between the adjacent viewpoints can be reduced, and thus a three-dimensional image formed by the three-dimensional display device is clearer and a display effect is improved. Besides, the quantity of the pixels in the row direction X is greater than the quantity of the pixels in the column direction Y in the display panel 1, and the viewpoints are preferentially distributed in the row direction so that resolutions in a transverse direction and a longitudinal direction can be effectively balanced. It needs to be noted that in the present disclosure, the pixels covered by the light splitting structures 201 specifically refer to pixels for light splitting through the light splitting structures 201, and when an overlapping area of one light splitting structure 201 and one pixel exceeds 50% of a pixel area, the pixel performs light splitting through the light splitting structure 201.

Figure 5:
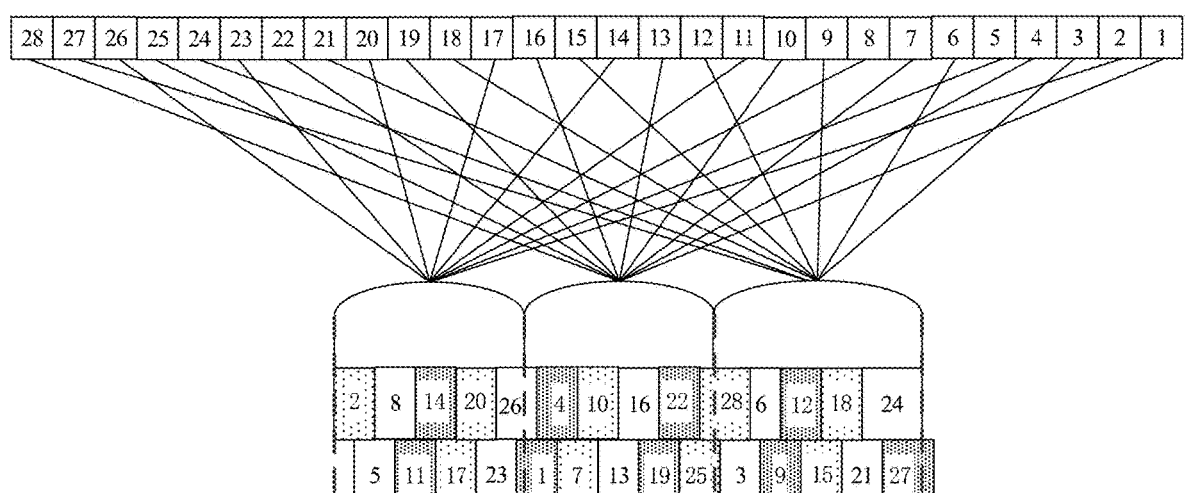
FIG. 5 is a schematic diagram of space distribution of viewpoint 28 in a three-dimensional display device provided by an embodiment of the present disclosure.

FIG. 1 exemplarily gives that one pixel repeating unit A corresponds to three light splitting structures 201, the pixel repeating unit A includes 28 pixels, and relative positions of the 28 pixels and the corresponding light splitting structures 201 are different so that 28 viewpoints may be formed through the corresponding light splitting structures 201, that is, light intensity information in 28 different directions may be loaded in each of the pixel repeating units A. As shown in FIG. 5, the pixel No. 2, the pixel No. 8, the pixel No. 14, the pixel No. 20, the pixel No. 26, the pixel No. 5, the pixel No. 11, the pixel No. 17 and the pixel No. 23 correspondingly form the viewpoint No. 2, the viewpoint No. 8, the viewpoint No. 14, the viewpoint No. 20, the viewpoint No. 26, the viewpoint No. 5, the viewpoint No. 11, the viewpoint No. 17 and the viewpoint No. 23 after light splitting through the corresponding left-side light splitting structure 201; the pixel No. 4, the pixel No. 10, the pixel No. 16, the pixel No. 22, the pixel No. 1, the pixel No. 7, the pixel No. 13, the pixel No. 19, the pixel No. 25 and the pixel No. 28 correspondingly form the viewpoint No. 4, the viewpoint No. 10, the viewpoint No. 16, the viewpoint No. 22, the viewpoint No. 1, the viewpoint No. 7, the viewpoint No. 13, the viewpoint No. 19, the viewpoint No. 25 and the viewpoint No. 28 after light splitting through the corresponding middle light splitting structure 201; and the pixel No. 6, the pixel No. 12, the pixel No. 18, the pixel No. 24, the pixel No. 3, the pixel No. 9, the pixel No. 15, the pixel No. 21 and the pixel No. 27 correspondingly form the viewpoint No. 6, the viewpoint No. 12, the viewpoint No. 18, the viewpoint No. 24, the viewpoint No. 3, the viewpoint No. 9, the viewpoint No. 15, the viewpoint No. 21 and the viewpoint No. 27 after light splitting through the corresponding right-side light splitting structure 201. It can be seen from FIG. 5 that the 28 viewpoints formed by light emitted by all the pixels in the pixel repeating unit A covered by the light splitting structures 201 are sequentially arranged in the row direction X in space.

Besides, in the present disclosure, light emitted by the pixels at the same position in all the pixel repeating units A (namely, the pixels with the same reference numbers in figure) each form a viewpoint through the respective corresponding light splitting structure 201. In other words, in the present disclosure, the pixels with the same reference numbers in all the pixel repeating units A each form a viewpoint of the same reference number. For example, the pixels No. 2 in all the pixel repeating units A each form the viewpoint No. 2.

In some embodiments, as shown in FIG. 1, light-emitting colors of the pixels at the same viewpoint in the three pixel repeating units A continuously arranged in the extension direction of each of the light splitting structures 201 are different.

As shown in FIG. 1, the light-emitting colors of the pixels at the same viewpoint in the three pixel repeating units A continuously arranged in the extension direction of each of the light splitting structures 201 may include three different colors of red, green and blue so that when the three pixel repeating units A continuously arranged along the extension direction of each of the light splitting structures 201 serve as a 3D display unit, an image of each viewpoint can be presented through light of the three colors of red, green and blue and then color shift of the 3D image can be effectively prevented. Besides, when one pixel repeating unit A and at least two light splitting structures 201 are correspondingly arranged, a resolution of human eyes can be met and the display effect of the 3D image can be effectively improved.

Figure 6:
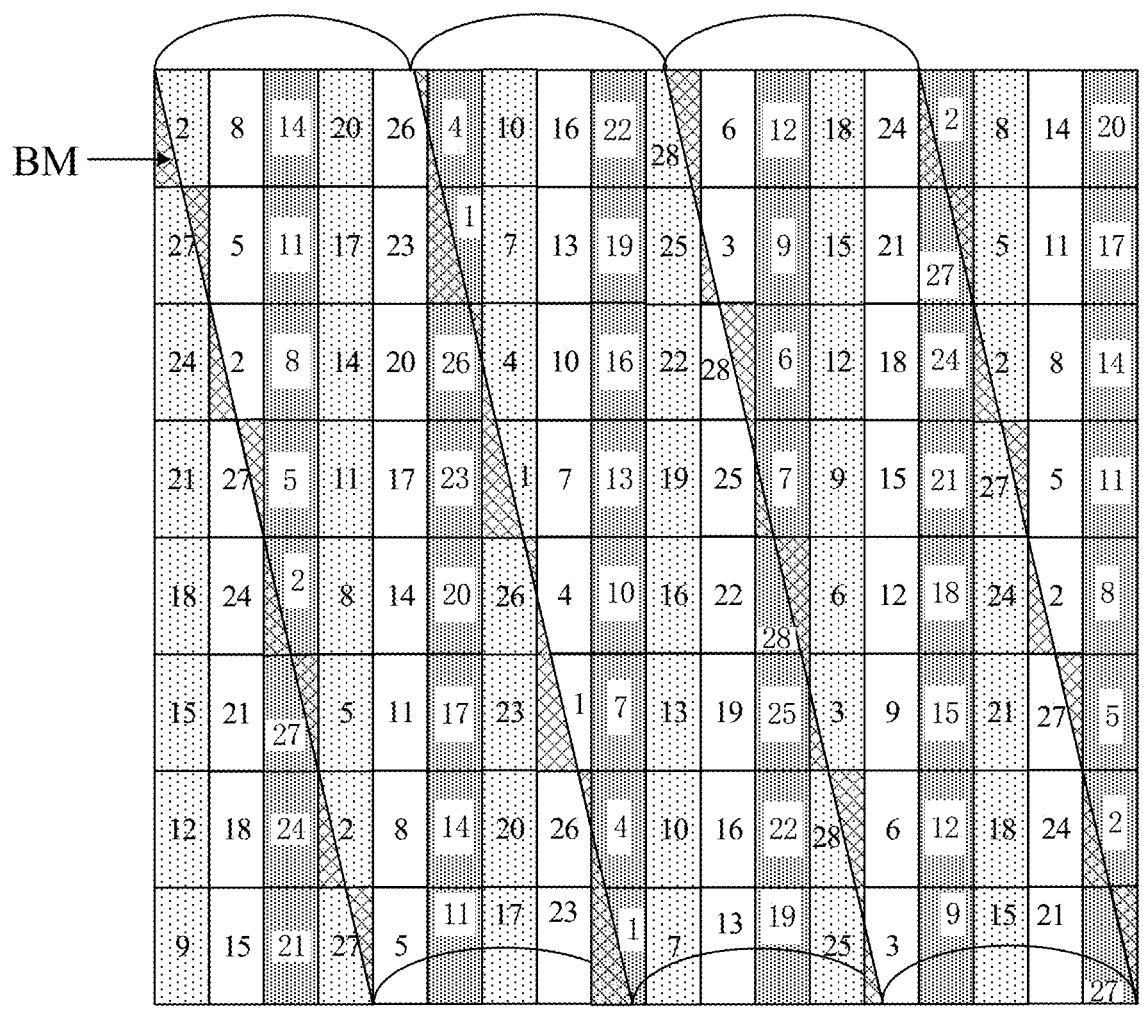
FIG. 6 is yet another schematic structural diagram of a three-dimensional display device provided by an embodiment of the present disclosure.

In some embodiments, as shown in FIG. 6, when the pixels (for example, the pixel No. 1, the pixel No. 2, the pixel No. 3, the pixel No. 4, the pixel No. 25, the pixel No. 26, the pixel No. 27 and the pixel No. 28) are covered by the two light splitting structures 201 at the same time, these pixels may cause crosstalk to their nearby viewpoints, so the pixels covered by the two adjacent light splitting structures 201 at the same time include a first partition and a second partition, the first partition is covered by one of the two light splitting structures 201, the second partition is covered by the other light splitting structure 201, and under the condition that an area of the first partition is smaller than that of the second partition, a pattern in a black matrix (BM) blocks the first partition but does not block the second partition by modifying a mask used for manufacturing the black matrix (BM) in the display panel 1 so that the light splitting structure 201 with a larger overlapping area with these pixels may be used for light splitting of these pixels, and a situation that a defect of crosstalk is caused by simultaneous light splitting of these pixels by the two light splitting structures 201 is avoided.

In some embodiments, each of the pixel repeating units A may include $N_2$ rows of pixels, and in order to guarantee a motion parallax of smooth watching of 3D motion, $N_2$ meets the following formula:

$$0 \le N_2 \le \frac{w}{k},$$

where w is the interval between two viewpoints formed by light of the two adjacent pixels in the row direction in the pixel repeating unit through the corresponding light splitting structure 201 and is smaller than a distance between two eyeballs of a human body, which is obtained by dividing a traditional viewpoint interval (generally a human eye pupil distance E=65 mm) at least twice, namely, $$w = \frac{E}{n} \le 32.5 \text{ mm},$$

where n is a positive integer greater than 1, and k is a viewpoint density to be reached. In the present solution, the viewpoint density refers to a distance between the two adjacent viewpoints, in order to guarantee the motion parallax of smooth watching of the 3D motion, in multi-view naked eye 3D display, k≤10 mm, the total quantity of viewpoints of the three-dimensional display device is N, and $N=N_1 \times N_2$.

It needs to be noted that during specific implementation, selection of k is related to the 3D display resolution and an inclination angle of each of the light splitting structures 201, and in order to realize an ideal display effect, an optimum k value may be obtained through limited times of experiments.

In some embodiments, the width D, in the row direction, of the orthographic projection of the light splitting structure 201 on the plane where the display panel 1 is located meets the following formula:

$$D \le 2L \times \tan\left(\frac{\pi}{180} \times \frac{1}{60} \times \frac{1}{2}\right).$$

In this way, the width D, in the row direction, of the light splitting structure 201 on the plane where the display panel 1 is located may be divided into an upper limit with a retina resolution of 1 minute of arc so that it can be guaranteed that a 2D display effect is not affected and meanwhile the resolution of the light splitting structure 201 can reach a retina angular resolution as lowest as possible.

In some embodiments, in order to guarantee enough viewable space, the width D, in the row direction, of the orthographic projection of the light splitting structure 201 on the plane where the display panel 1 is located meets the following formula:

$$D \ge \frac{hQ}{L},$$

where Q is a minimum viewable width of the three-dimensional display device.

In some embodiments, a ratio of the width D, in the row direction X, of the orthographic projection of each of the light splitting structures 201 on the plane where the display panel 1 is located to the vertical distance h from the pixel to the light splitting structure 201 may be in a range of 0.1-0.5. Within this ratio range, technological fabrication and manufacturing and a light splitting effect of each of the light splitting structures 201 are facilitated. For example, when the light splitting structure 201 is the cylindrical lens, if the ratio is large, a shape of the cylindrical lens is too arched, which causes difficult fabrication, and moreover, if the ratio is too large, light splitting performance of the cylindrical lens will become poor.

Figure 2:
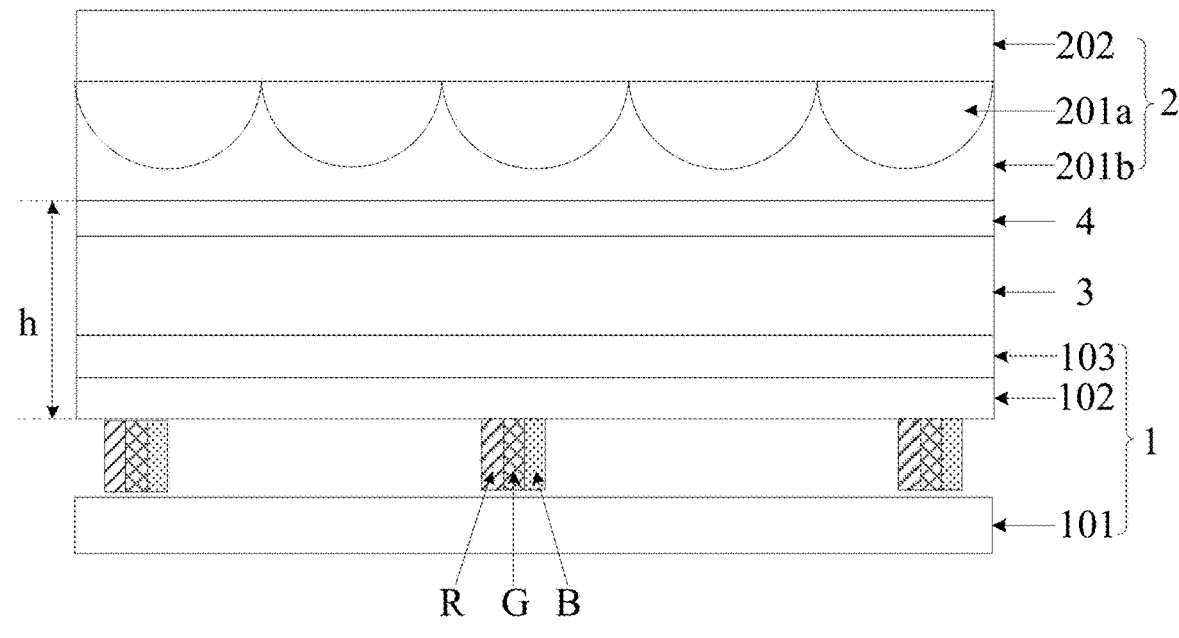
FIG. 2 is another schematic structural diagram of a three-dimensional display device provided by an embodiment of the present disclosure.

Besides, under the condition that the ratio of the width D, in the row direction, of the orthographic projection of each of the light splitting structures 201 on the plane where the display panel 1 is located to the vertical distance h from the pixel to the light splitting structure 201 meets 0.1-0.5, a thickness of each film layer in the three-dimensional display device may be changed. In some embodiments, as shown in FIG. 2, a thickness of a substrate 202 made of a PET material is 0.25 mm, a thickness of the second resin layer 201b is 0.03 mm, a thickness of the space glass 3 is 3 mm, a thickness of the optical clear adhesive 4 is 0.3 mm, a thickness of the color film substrate 102 is 0.5 mm, a thickness of the polarizer 103 is 0.17 mm, a thickness of the array substrate 101 is 0.5 mm, and at the moment, the vertical distance h from the pixel to the light splitting structure 201 is 4±0.2 mm. Each of refractive indexes of the space glass 3, the optical clear adhesive 4, the color film substrate 102 and the polarizer 103 is 1.5.

It needs to be noted that in some embodiments, the above light splitting structure 201 may be the cylindrical lens. By setting the light splitting structure 201 as the cylindrical lens, transmittance of light emitted by each of the pixels can be improved advantageously, and thus brightness of the 3D image displayed by the three-dimensional display device can be improved advantageously.

In some other embodiments, the light splitting assembly 2 may include a plurality of light blocking strips and a plurality of light transmitting strips which are arranged alternately in sequence in the row direction X. Each of the light splitting structures 201 may include a light transmitting strip and light blocking strip halves which are located on two sides of the light transmitting strip respectively. Optionally, a width a of the light transmitting strip in the row direction meets the following formula:

$$a = \frac{w \times Px}{w + Px}$$

so that crosstalk between the adjacent viewpoints can be reduced.

In some embodiments, in order to avoid Moire patterns, as shown in FIG. 1, the plurality of light splitting structures 201 may extend in a direction forming an acute angle θ with the column direction Y.

In some embodiment, the acute angle θ between the extension direction of each of the light splitting structures 201 and the column direction Y meets the following formula:

$$\tan\theta = \frac{M}{N_2 \times K},$$

where K is a ratio of a size of a pixel in the column direction to a size of the pixel in the row direction, M≥1, M is an integer, and a greatest common divisor of M and $N_2$ is 1.

The light splitting structure 201 meeting the above inclination angle has two effects: first, the quantity of the viewpoints in the row direction X can be increased by fully using the pixels in the column direction Y, and second, influence of the Moire patterns on the 3D display effect can be reduced.

In some embodiments, within a range of 5°≤θ≤16°, demands of actual watching are met, and an effect of effectively reducing the Moire patterns is achieved.

It needs to be noted that the ratio K of the size of the pixel in the column direction Y to the size of the pixel in the row direction X may be set as required, exemplarily, the ratio between the size of the pixel in the column direction Y to the size of the pixel in the row direction X may be set to be 3:1, at the moment, each of the pixels is a sub-pixel used for displaying different colors, for example, the red sub-pixel or the green sub-pixel or the blue sub-pixel, the three sub-pixels of the red sub-pixel, the green sub-pixel and the blue sub-pixel sequentially arranged in the row direction X serve as one cycle period for repeated arrangement in the row direction X, at the moment, the ratio of the size of the whole three sub-pixels in the column direction to the size of the whole three sub-pixels in the row direction is approximately 1, and thus the display effect of a color display panel is improved advantageously.

Figure 7:
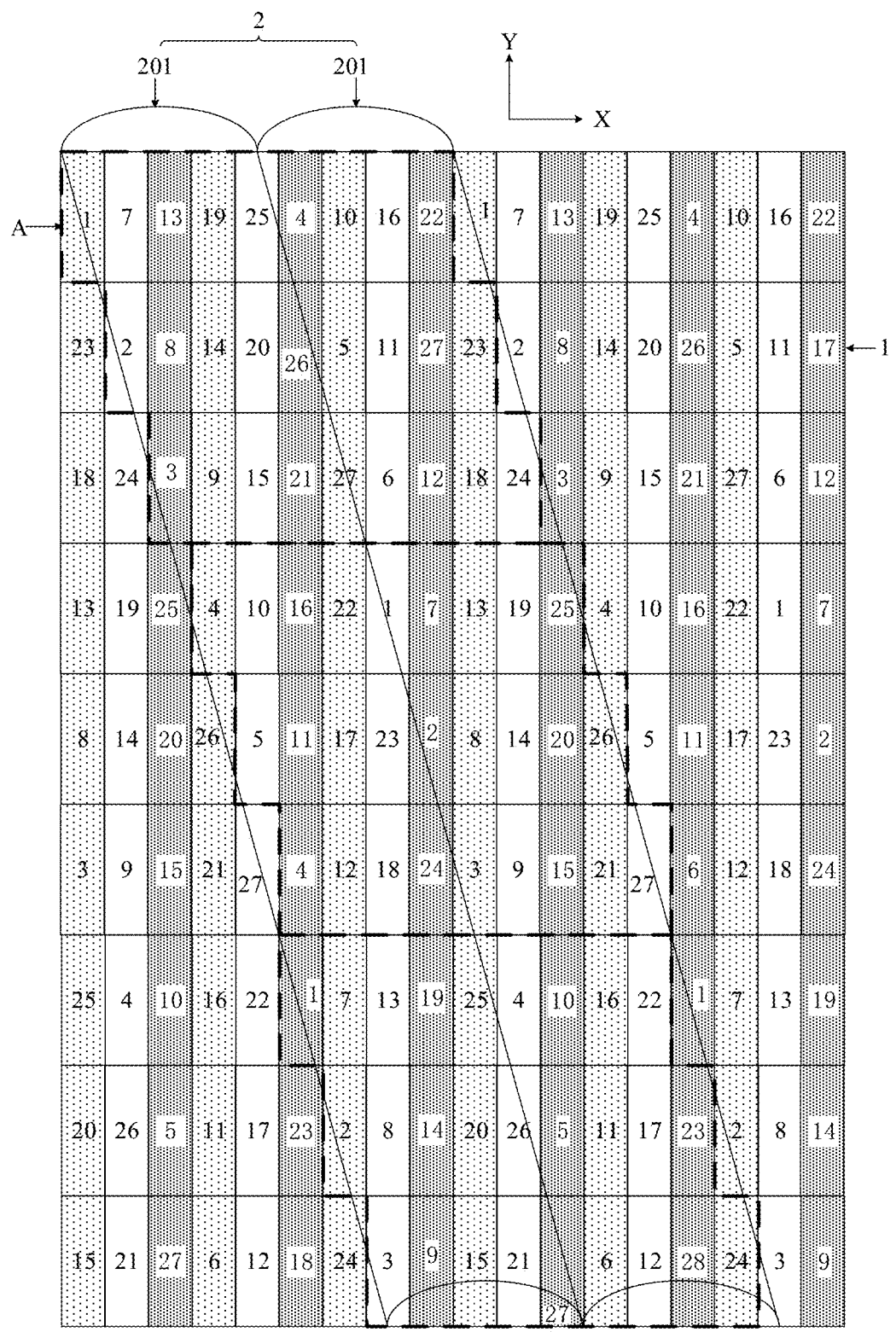
FIG. 7 is yet another schematic structural diagram of a three-dimensional display device provided by an embodiment of the present disclosure.
Figure 8:
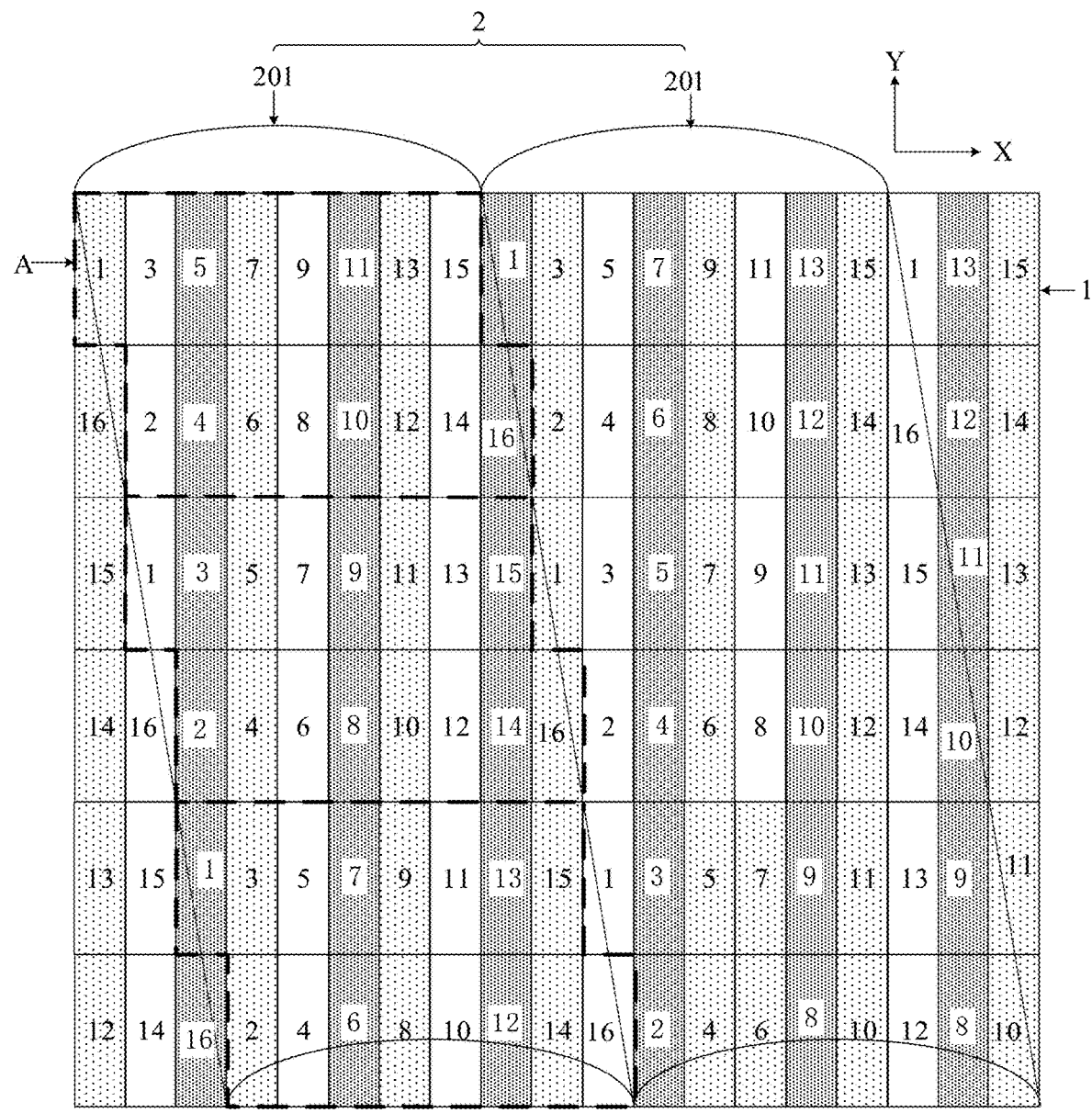
FIG. 8 is yet another schematic structural diagram of a three-dimensional display device provided by an embodiment of the present disclosure.

In some embodiments, in order to realize a better 3D display effect, the ratio K of the size of the pixel in the column direction Y to the size of the pixel in the row direction X may be set to be 3, $N_1$ is set to be 14, $N_2$ is set to be 2 and θ is set to be 9.46°, as shown in FIG. 1; or $N_1$ is set to be 9, $N_2$ is set to be 3 and θ is set to be 15.5°, as shown in FIG. 7; and or $N_1$ is set to be 8, $N_2$ is set to be 2, and θ is set to be 9.46°, as shown in FIG. 8.

In some embodiments, each row of pixels in the same pixel repeating unit A are staggered by a distance Px of one pixel in sequence in the row direction X, as shown in FIG. 1, FIG. 7 and FIG. 8; besides, when $N_2$ is 2, the adjacent rows of pixels in the two pixel repeating units A continuously arranged in the extension direction of each of the light splitting structures 201 are aligned in the column direction Y, as shown in FIG. 1 and FIG. 7; and when $N_2$ is 3, the adjacent rows of pixels in the $(2n)^{th}$ pixel repeating unit A and $(2n-1)^{th}$ pixel repeating unit A in the extension direction of each of the light splitting structures 201 are staggered by a distance Px of one pixel in the row direction X, the adjacent rows of pixels in the $(2n)^{th}$ pixel repeating unit A and $(2n+1)^{th}$ pixel repeating unit A are aligned in the column direction Y, n≥1, and n is an integer, as shown in FIG. 8. Besides, it can be seen from FIG. 1 and FIG. 8 that light-emitting colors of the three pixels at the same viewpoint in the three pixel repeating units A continuously arranged in the row direction X are different. In FIG. 7, the light-emitting colors of the three pixels at the same viewpoint in the three pixel repeating units A continuously arranged in the row direction X are the same.

Taking a distribution mode shown in FIG. 1 for example below, a super multi-view 3D display technical solution provided by the present disclosure is further described.

In FIG. 1, a length-to-width ratio of the sub-pixel is 3:1, the light splitting structure 201 is the cylindrical lens, the total quantity of the viewpoints formed in each of the pixel repeating units A is 28, wherein there are two vertical viewpoints and 14 horizontal viewpoints, and an angle θ of the cylindrical lens meets:

$$\tan\theta = \frac{1}{6},$$

namely, the inclination angle θ of the cylindrical lens is 9.46°, the sub-pixel to which the viewpoint No. 2 in the first row and the first column in FIG. 1 corresponds is a center of a screen, and an alignment principle of a 3D cylindrical lens film is to extend towards the left and right from the center of the screen. Coding distribution is performed according to a relative position relation of the lenses and the sub-pixels and is designed to be distribution of 28 viewpoints shown in FIG. 1. The cylindrical lenses in FIG. 1 use three cylindrical lenses as one lens cycle, each lens cycle horizontally covers 14 sub-pixels of the pixel repeating unit A, and each cylindrical lens covers widths of four and two thirds sub-pixels. In order to prevent the problem of color shift of the 3D displayed image, 28*3 sub-pixels within a range in an extension direction of each of the cylindrical lens can be defined as a 3D image display unit, the same viewpoint in a cycle of the 3D image display unit contains three colors of red, green and blue, and thus image color shift can be effectively prevented.

Figure 9:
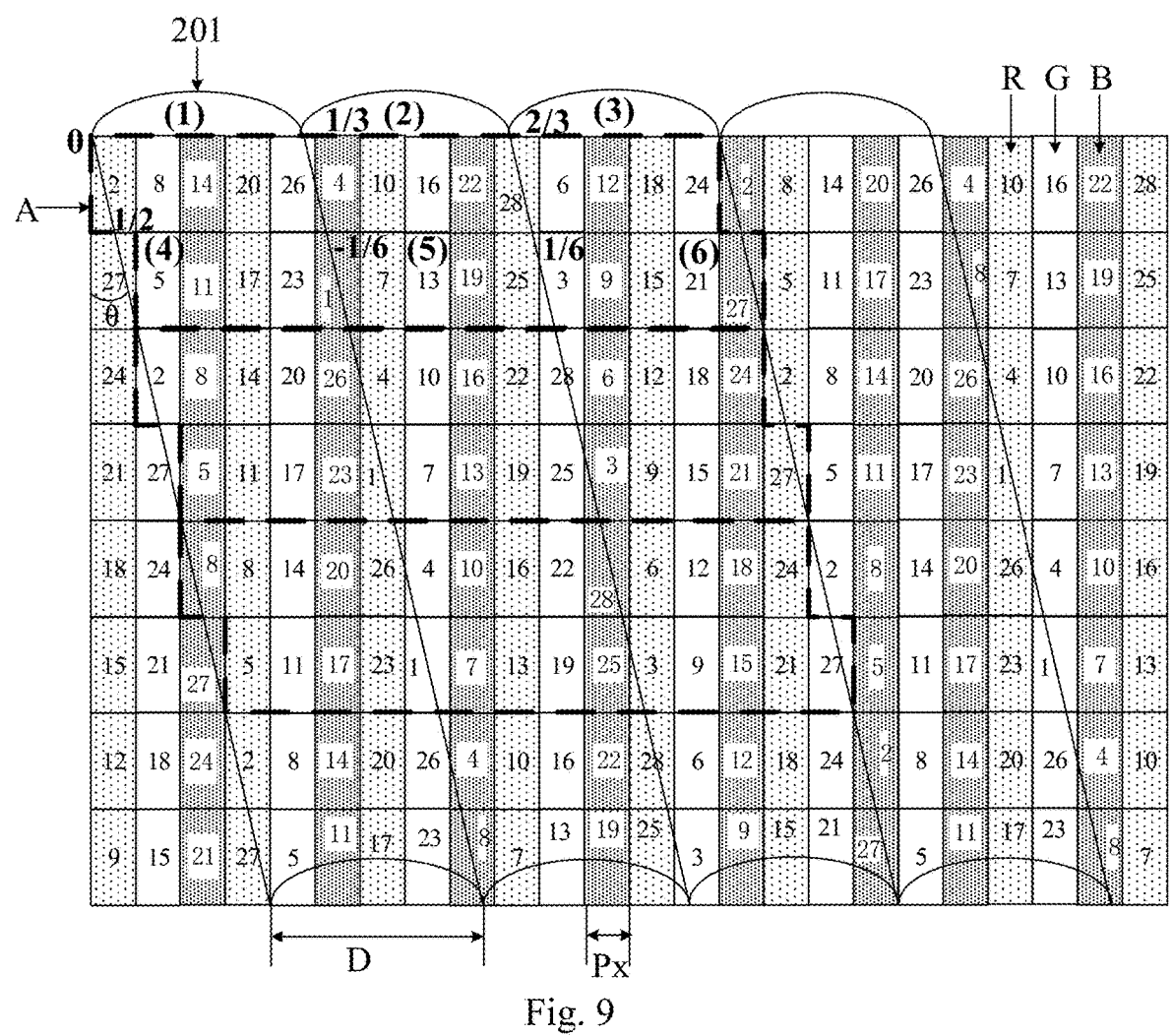
FIG. 9 is a schematic diagram of a relative position relation of each sub-pixel and a cylindrical lens in a pixel repeating unit provided by an embodiment of the present disclosure.

As shown in FIG. 9, in order to further analyze the relative position relation between all the sub-pixels, it can be judged according to difference of distances of left edges of the sub-pixels to left edges of their corresponding cylindrical lenses (this method is equivalent to judging a distance from a center of each sub-pixel to a center of an optical axis of the lens). Hypothetically, a width of each sub-pixel is one unit length, 28 sub-pixels in one pixel repeating unit A are divided into 6 regions, respectively defined as regions (1) to (6). It can be seen from FIG. 9 that a distance from a left-end initial position of a sub-pixel group of the region (1) to a left end of its corresponding cylindrical lens is 0; a distance from a left-end initial position of a sub-pixel group of the region (2) to a left end of its corresponding cylindrical lens is 1/3 unit length; a distance from a left-end initial position of a sub-pixel group of the region (3) to a left end of its corresponding cylindrical lens is 2/3 unit length; a distance from a left-end initial position of a sub-pixel group of the region (4) to a left end of its corresponding cylindrical lens is 1/2 unit length; a left-end initial position of a sub-pixel group of the region (5) to a left end of its corresponding cylindrical lens is −1/6 unit length; and a distance from a left-end initial position of a sub-pixel group of the region (6) to a left end of its corresponding cylindrical lens is 1/6 unit length.

The relative position relation of all the sub-pixels and the lenses in the different regions and a forming process of the 28 viewpoints are further described, a distance of the pixels in the region (1) relative to the left ends of the cylindrical lenses are respectively 0 unit length, 1 unit length, 2 unit lengths, 3 unit lengths and 4 unit lengths; a distance of the pixels in the region (2) relative to the left ends of the cylindrical lenses are respectively 1/3 unit length, 4/3 unit lengths, 7/3 unit lengths, 10/3 unit lengths and 13/3 unit lengths; a distance of the pixels in the region (3) relative to the left ends of the cylindrical lenses are respectively 2/3 unit length, 5/3 unit lengths, 8/3 unit lengths and 11/3 unit lengths; a distance of the pixels in the region (4) relative to the left ends of the cylindrical lenses are respectively 1/2 unit length, 3/2 unit lengths, 5/2 unit lengths and 7/2 unit lengths; a distance of the pixels in the region (5) relative to the left ends of the cylindrical lenses are respectively −1/6 unit length, 5/6 unit length, 11/6 unit length, 17/6 unit length and 23/6 unit length; and a distance of the pixels in the region (6) relative to the left ends of the cylindrical lenses are respectively 1/6 unit length, 7/6 unit lengths, 13/6 unit lengths, 19/6 unit lengths and 25/6 unit lengths. It can be seen that all the sub-pixels have different relative positions with their corresponding cylindrical lenses, so that each of the sub-pixels is refracted in the row direction X to different positions in space under the action of its corresponding cylindrical lens over it (as shown in FIG. 5), and super multi-view 3D display is realized.

Figure 10:
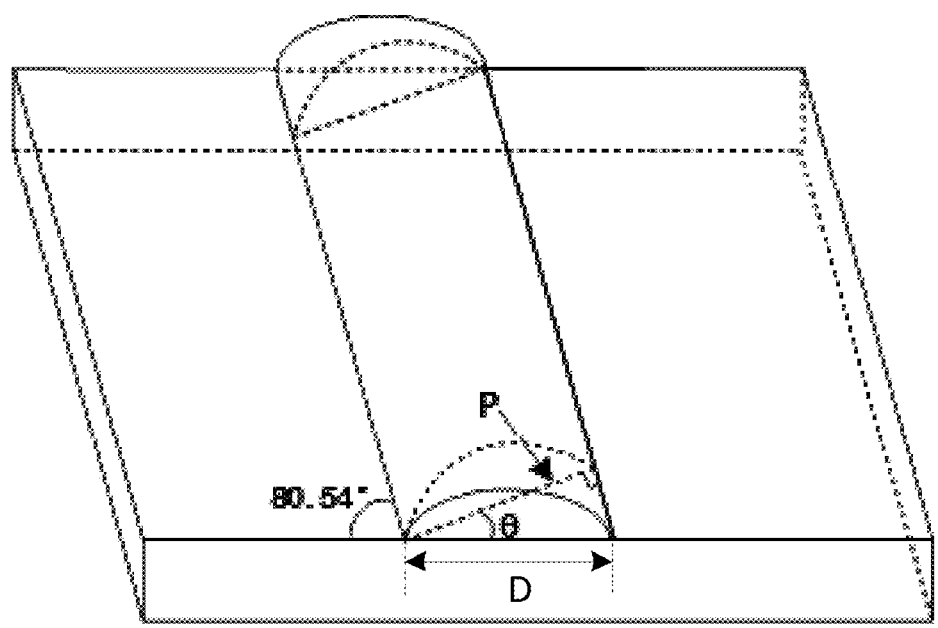
FIG. 10 is a schematic structural diagram of a light splitting assembly including cylindrical lenses provided by an embodiment of the present disclosure.

In some embodiments, as shown in FIG. 10, a grating distance P of the cylindrical lens provided by the embodiment of the present disclosure is an aperture of an actual lens, namely, an aperture in the vertical direction. The grating distance P of the cylindrical lens and the aperture (namely, the width D of the light splitting structure 201 in the row direction X) of the cylindrical lens in the horizontal direction meet: P=D×COS θ. Exemplarily, D is equal to 0.2889215 mm, θ is equal to 9.46°, and thus according to a formula P=D×COS θ, it can be obtained that the grating distance P is equal to 0.284909. Optionally, a curvature radius of the cylindrical lens is 0.55039 mm, and an arch height is 0.018766 mm.

Figure 3:
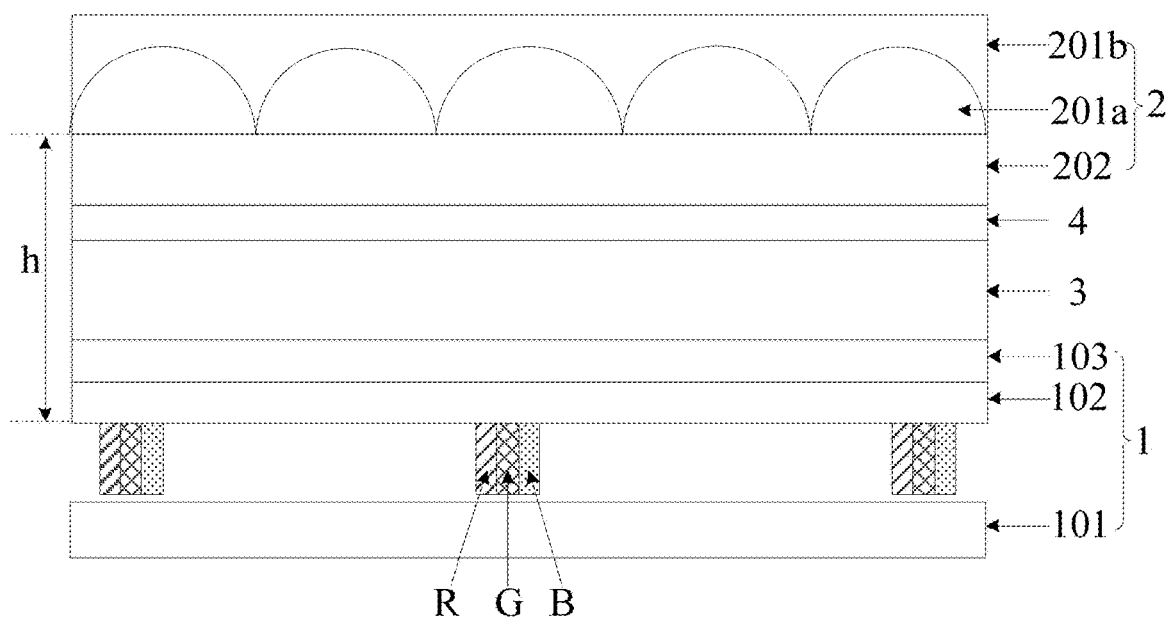
FIG. 3 is yet another schematic structural diagram of a three-dimensional display device provided by an embodiment of the present disclosure.
Figure 4:
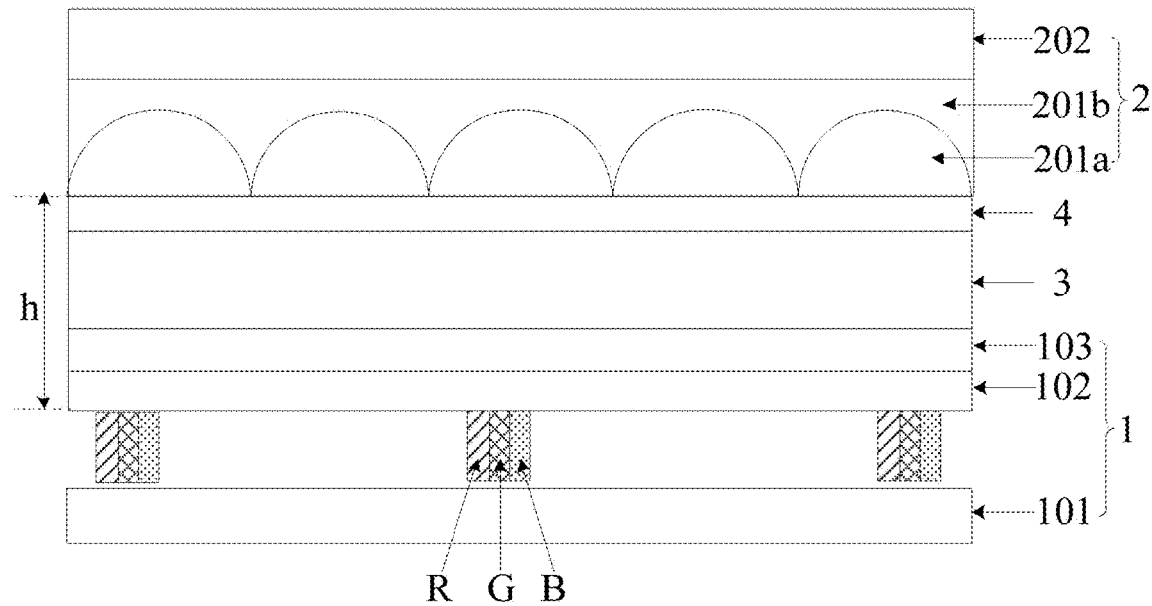
FIG. 4 is yet another schematic structural diagram of a three-dimensional display device provided by an embodiment of the present disclosure.

Besides, as shown in FIG. 2 to FIG. 4, the light splitting structure 201 may be a compound lens formed by the first resin layer 201a and the second resin layer 201b, the refraction index of the first resin layer 201a is greater than the refraction index of the second resin layer 201b. In some embodiments, the first resin layer 201a includes of a plurality of cylindrical lenses, the second resin layer 201b fills a gap of each cylindrical lens, and a thickness of the second resin layer is greater than the arch height of each cylindrical lens. The cylindrical lens may be of an edged or edge-free structure, a refractive index difference Δn of the first resin layer 201a and the second resin layer 201b is equal to 0.2, for example, the refractive index of the first resin layer 201a is 1.61, and the refractive index of the second resin layer 201b is 1.41, which is not limited to this refractive index combination. Specific to different Δn values, a shape of the cylindrical lens may differ, and different refractive index combinations of the same Δn values almost have no influence on own features of the cylindrical lens. Optionally, as shown in FIG. 2 to FIG. 4, the compound lens may use a transparent material as a substrate 202, exemplarily, the material of the substrate 202 may be polyethylene terephthalate (PET) with a refractive index being 1.54.

Figure 11:
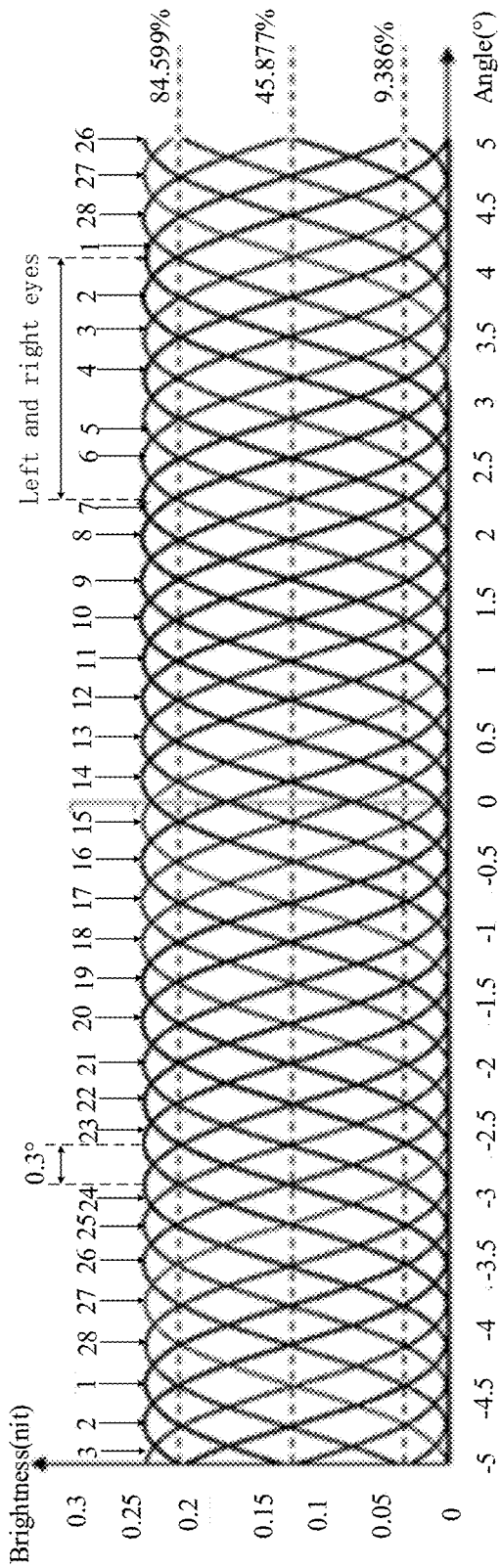
FIG. 11 is a curve of brightness of white light of viewpoint 28 shown in FIG. 5.

The present disclosure takes the above 28-viewpoint distribution design solution for example, a 3D effect in an optimum watching distance L=2 m is simulated, when the obtained viewpoint density is about 10 mm (a corresponding viewpoint angle interval is about 0.3°), correspondingly within a range of 60 mm to 70 mm of the horizontal viewpoint interval, it is suitable for a pupil distance of common human eyes, and a curve of brightness of white light of each viewpoint is specifically shown in FIG. 11. It can be seen that a first-level crosstalk ratio is 84.599%, a second-level crosstalk ratio is 45.877%, a third-level crosstalk ratio is 9.386%, a fourth-level crosstalk ratio is 0%, and in the premise of the same viewpoint density, crosstalk in a single visual region is effectively reduced, and a stereo effect of the 3D image is improved.

In another aspect, an embodiment of the present disclosure further provides a driving method for the above three-dimensional display device. As a principle of solving problems of the driving method is similar to that of solving problems of the above three-dimensional display device, implementation of the driving method can refer to the embodiment of the above three-dimensional display device, and repetitions are not repeated.

Figure 12:
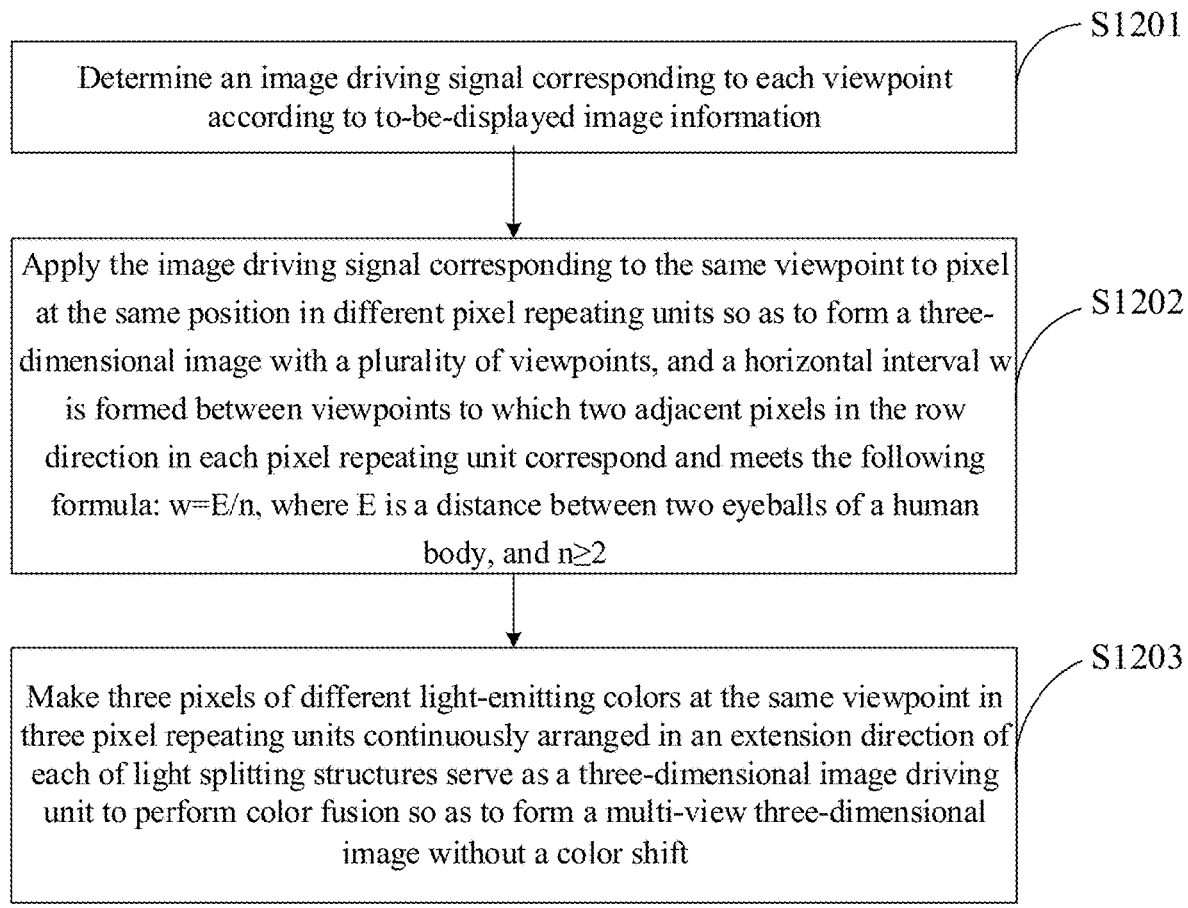
FIG. 12 is a flowchart of a driving method for a three-dimensional display device provided by an embodiment of the present disclosure.

In some embodiments, the driving method for the three-dimensional display device provided by embodiments of the present disclosure as shown in FIG. 12, may include the following steps:

S1201, an image driving signal corresponding to each viewpoint is determined according to to-be-displayed image information; and S1202, the image driving signal corresponding to the same viewpoint is applied to pixel at the same position in different pixel repeating units so as to form a three-dimensional image having a plurality of viewpoints, and a horizontal interval w is formed between viewpoints to which two adjacent pixels in the row direction in each pixel repeating unit correspond and meets the following formula:

$$w = \frac{E}{n},$$

where E is a distance between two eyeballs of a human body, and n≥2.

In some embodiments, in order to effectively solve the problem of color shift of an 3D displayed image, after step S1202 is executed, the following step may be further executed:

S1203, three pixels of different light-emitting colors at the same viewpoint in three pixel repeating units continuously arranged in an extension direction of each of light splitting structures serve as a three-dimensional image driving unit to perform color fusion so as to form a multi-view three-dimensional image without a color shift.

It needs to be noted that as shown in FIG. 1 and FIG. 8, the light-emitting colors of the three pixels at the same viewpoint in the three pixel repeating units A continuously arranged in the row direction X are different, so the three pixels of different light-emitting colors at the same viewpoint in three pixel repeating units A continuously arranged in the row direction X serve as a three-dimensional image driving unit to perform color fusion so as to form a multi-view three-dimensional image without a color shift.

In another aspect, an embodiment of the present disclosure further provides a manufacturing method for the above three-dimensional display device. As a principle of solving problems of the manufacturing method is similar to that of solving problems of the above three-dimensional display device, implementation of the manufacturing method may refer to the embodiment of the above three-dimensional display device.

Figure 13:
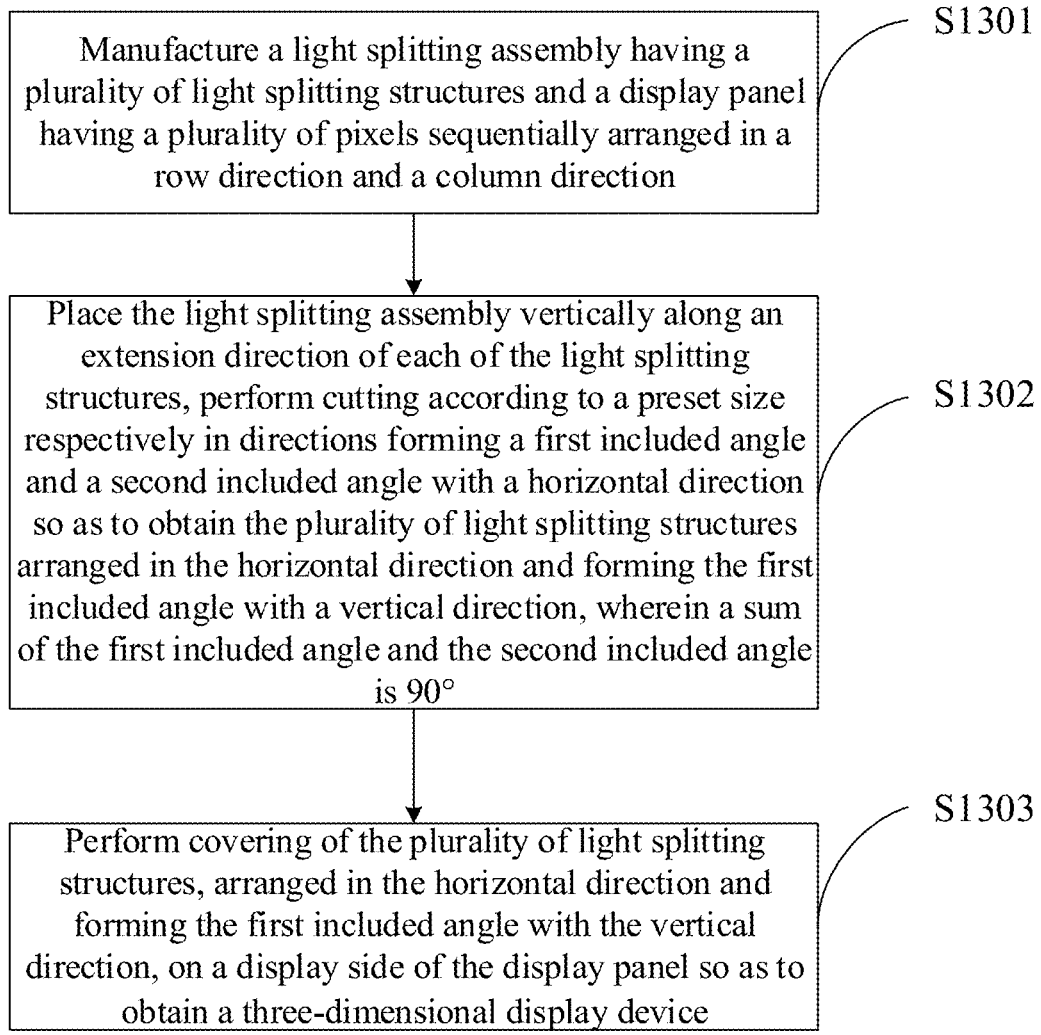
FIG. 13 is a flowchart of a manufacturing method for a three-dimensional display device provided by an embodiment of the present disclosure.

In some embodiments, the three-dimensional display device, as shown in FIG. 13, which may include the following steps:

S1301, a light splitting assembly having a plurality of light splitting structures and a display panel having a plurality of pixels sequentially arranged in a row direction and a column direction are manufactured;

S1302, the light splitting assembly is placed vertically along an extension direction of each of the light splitting structures, cutting is performed according to a preset size respectively in directions forming a first included angle and a second included angle with a horizontal direction so as to obtain the plurality of light splitting structures arranged in the horizontal direction and forming the first included angle with a vertical direction, wherein a sum of the first included angle and the second included angle is 90°; and S1303, covering of the plurality of light splitting structures, arranged in the horizontal direction and forming the first included angle with the vertical direction, on a display side of the display panel is performed so as to obtain the three-dimensional display device.

In order to better understand the technical solution of the manufacturing method of the present disclosure, description is made below by taking manufacturing of the three-dimensional display device shown in FIG. 2 for example.

Figure 14:
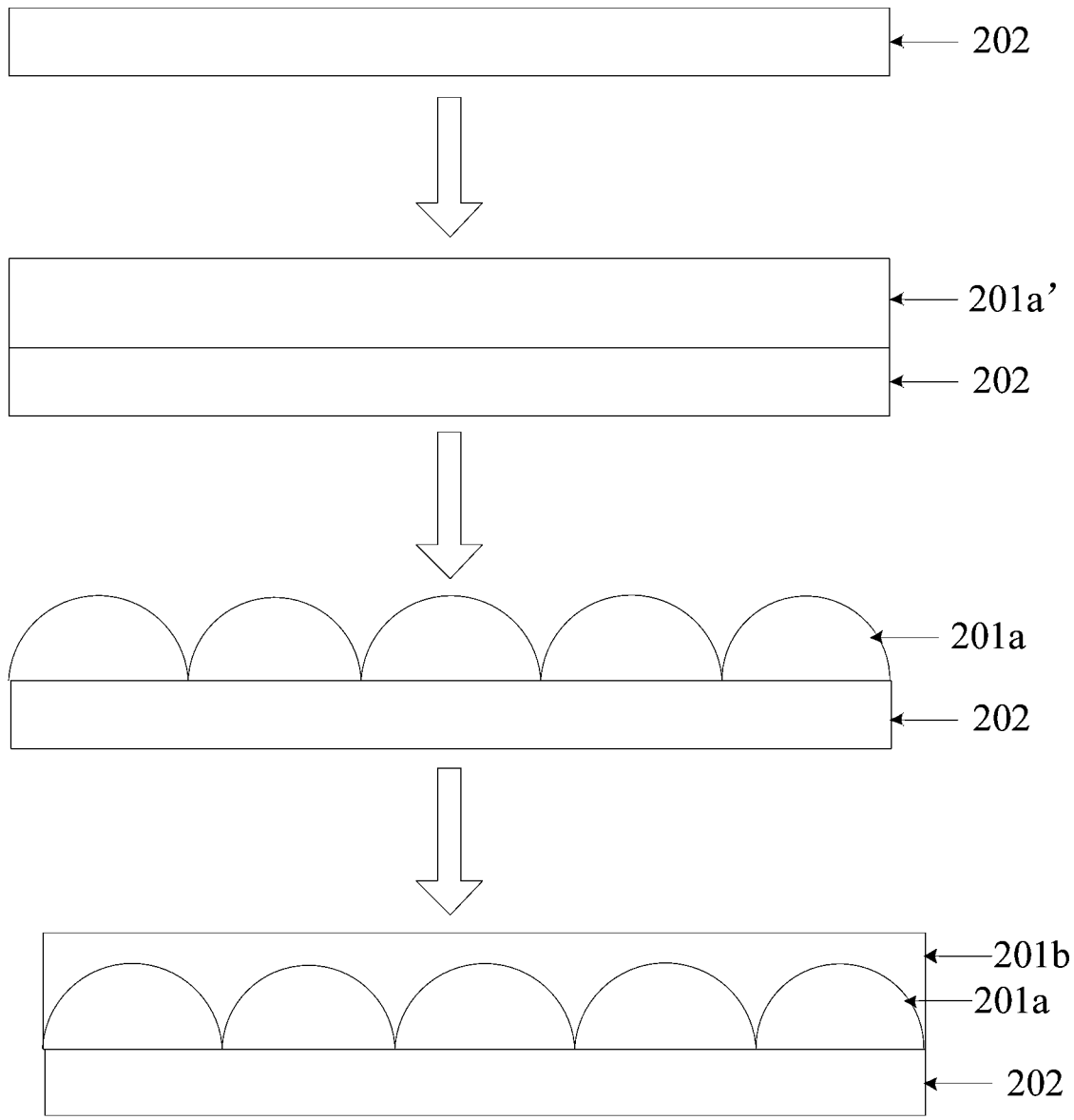
FIG. 14 is a flowchart of manufacturing a light splitting assembly including cylindrical lenses provided by an embodiment of the present disclosure.
Figure 15:
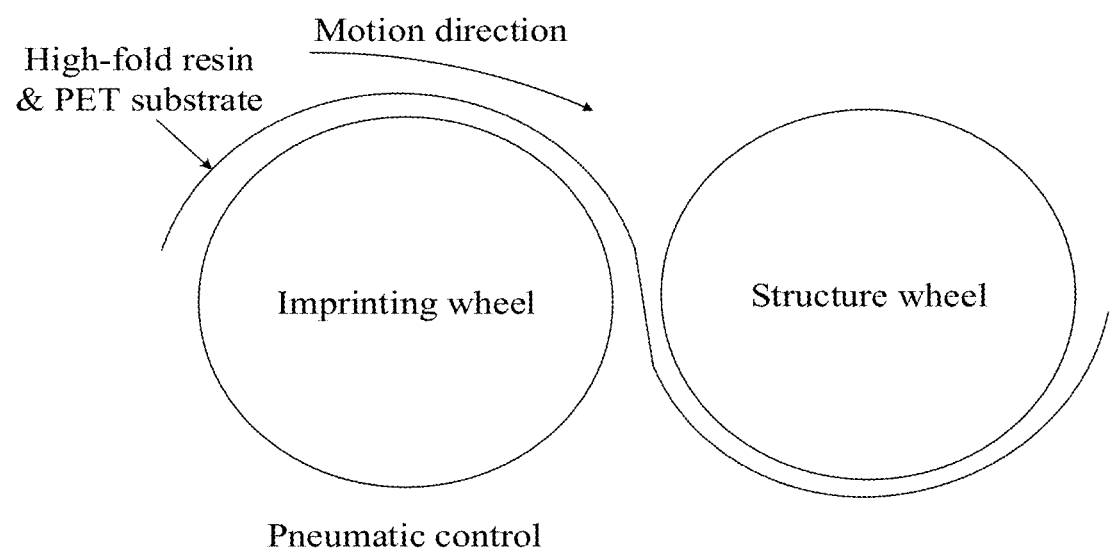
FIG. 15 is a schematic diagram of manufacturing cylindrical lenses in a reel-to-reel nano-imprinting technology provided by an embodiment of the present disclosure.

First step, as shown in FIG. 14, manufacturing the light splitting assembly 2 may include: a substrate 202 is coated with a layer of high-refraction-index resin 201a'; the high-refraction-index resin 201a' is made to form the first resin layer 201a including a plurality of cylindrical lenses in a reel-to-reel (R2R) nano-imprinting mode; and the second resin layer 201b is formed on the plurality of cylindrical lenses, and a thickness of the second resin layer 201b is greater than an arch height of each of the cylindrical lenses in a direction perpendicular to the substrate 202. As shown in FIG. 15, a needed large-size 3D cylindrical lens is manufactured by using a R2R nano-imprinting technology. A needed cylindrical lens complementary structure is engraved in a surface of an imprinting wheel, an imprinted structure is controlled by adjusting the imprinting wheel in a pneumatic mode, meanwhile, a structure wheel serves as an auxiliary wheel to adjust and control the force intensity of an imprinting process, and an imprinting speed is about 1 m/min. A PET soft film serves as the substrate 202, an imprinting adhesive (namely, the high-refraction-index resin 201a') with viscosity being 1500 cp to 2000 cp is applied to the surface of the substrate 202, an adhesive applying process adopts an adhesive dispensing mode, it is guaranteed that the quantity of applied adhesive is greater than the needed quantity of adhesive of imprinting, an excessive adhesive will be rolled off by the wheel during imprinting, ultraviolet (UV) curing is performed for 20 s, and thus the plurality of needed cylindrical lenses are formed.

Figure 16:
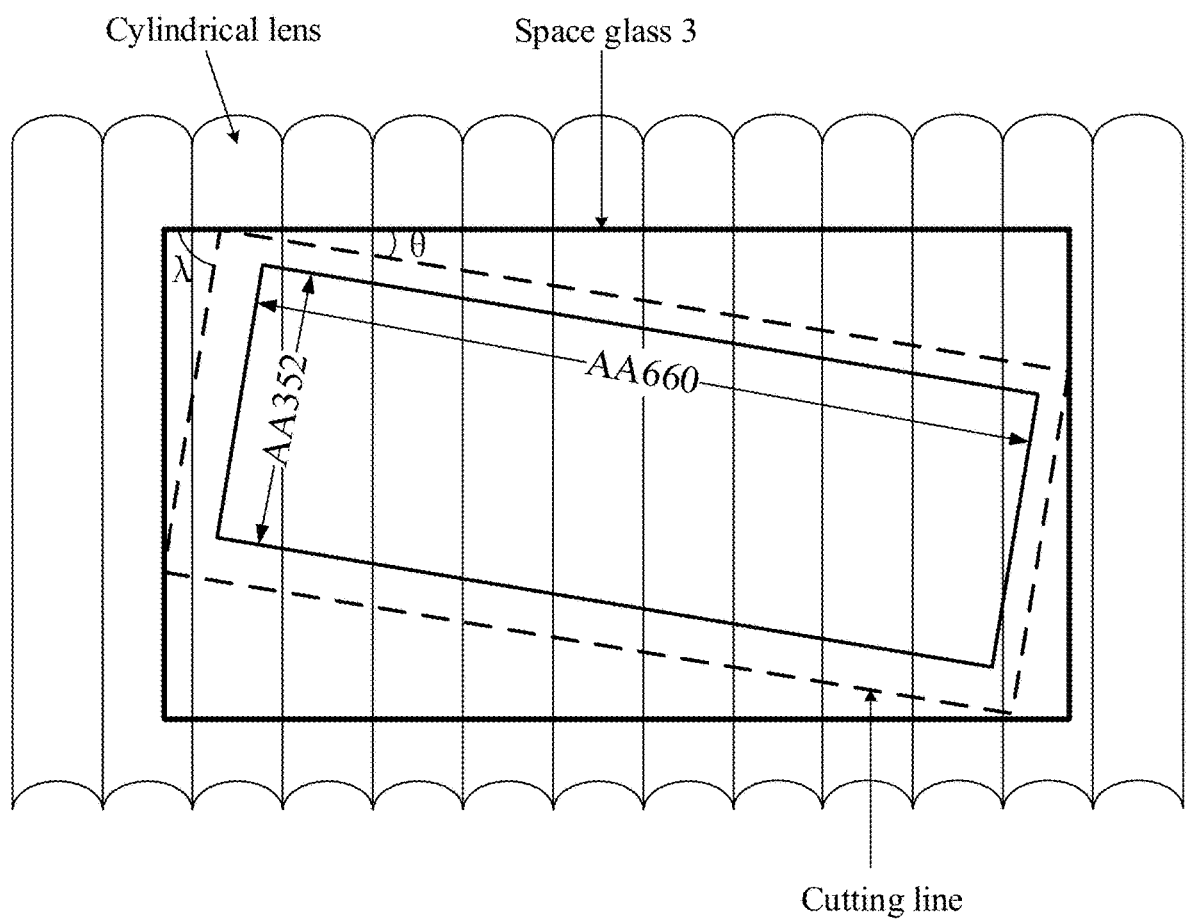
FIG. 16 is a schematic diagram of bonding and cutting of a light splitting assembly and space glass shown in FIG. 14 provided by an embodiment of the present disclosure.

Second step, as shown in FIG. 16, as there is a need for reducing Moire patterns in an optical design, a certain inclination angle θ needs to be formed between the plurality of cylindrical lenses and the display panel 1, the actually formed cylindrical lenses are vertical, the plurality of cylindrical lenses may be vertically placed, alignment of space glass 3 and the cylindrical lenses is adjusted, so that the both can be placed in a λ angle of about 80.54°, then alignment adjustment is completed, the space glass 3 and the second resin layer 201b are bonded through an optical clear adhesive 4 (not shown in figure) and cured, finally cutting is performed along the space glass 3 of a dotted line box in FIG. 16, and thus a large-size cylindrical lens structure which is periodically distributed in an angle of 80.54° relative to the space glass 3. A long edge of the dotted line box representing a cutting line is (1440.48±0.5) mm, and its short edge is (818.02±0.5) mm; a long edge A660 of a display region AA is (1438.08±0.5) mm, and its short edge AA352 is (812.82±0.5) mm; an aperture (namely, a width D of the light splitting structure 201 in the row direction X) of one cylindrical lens in the horizontal direction is (288.9215±0.5) μm, an aperture (namely, a grating distance P) in a vertical direction is (284.99±0.5) μm, a length in the extension direction is (1428.427896±0.02) mm, and a curvature radius is (550.39±0.5) μm.

Third step, as shown in FIG. 1 and FIG. 2, covering of the light splitting assembly 2 bonded to the space glass 3 on the display side of the display panel 1 is performed so as to obtain the three-dimensional display device.

To sum up, by adjusting an interval between every adjacent viewpoints in the present disclosure, parameters of a device structure film layers and a distribution mode of the multi-view image on a pixel panel are optimized, so that crosstalk of light emitted by the multi-view image within a watching range of a main visual region is reduced, meanwhile transition between viewpoint images is more smooth, a dead zone is reduced, the Moire patterns are eliminated, and super multi-view naked eye 3D display without color shift is realized.

Apparently, those skilled in the art can make various changes and transformations for the embodiments of the present disclosure without departing from the spirit and scope of the embodiments of the present disclosure. In this case, if these changes and transformations of the embodiments of the present disclosure fall within the scope of the claims and their equivalents of the present disclosure, the present disclosure also intends to include these changes and transformations.

What is claimed is:

1. A three-dimensional display device, comprising:
a display panel comprising a plurality of pixels sequentially arranged in a row direction and a column direction; and
a light splitting assembly arranged on a display side of the display panel and comprising a plurality of light splitting structures, the light splitting structures are parallel to each other and sequentially arranged in the row direction, wherein
pixels of the display panel covered by at least one of the light splitting structures are divided into at least one pixel repeating unit, and the at least one pixel repeating unit is sequentially arranged along an extension direction of the at least one of the light splitting structures; light emitted by pixels at same position in all of the pixel repeating units forms a viewpoint through respective corresponding light splitting structures; and
a width, in the row direction, of an orthographic projection of each of the light splitting structures on a plane where the display panel is located is D, each of the pixel repeating units comprises at least two rows of pixels, each row of pixels comprises $N_1$ pixels, and $N_1$ and D meet a following formula:

$$N_1 = \frac{D \times (L+h)}{L \times Px},$$

wherein L is a vertical distance from a human eye observation point to the light splitting structure, h is a vertical distance from a pixel to the light splitting structure, and Px is a size of the pixel in the row direction.

2. The three-dimensional display device according to claim 1, wherein light-emitting colors of pixels at a same viewpoint in three of the pixel repeating units continuously arranged in the extension direction of the light splitting structure are different.

3. The three-dimensional display device according to claim 1, wherein each of the pixel repeating units comprises $N_2$ rows of pixels, and $N_2$ meets the following formula:

$$0 \leq N_2 \leq \frac{w}{k},$$

wherein w is an interval between two viewpoints formed by light of two adjacent pixels in the row direction in the pixel repeating unit through the corresponding light splitting structures, the interval w is smaller than a distance between two eyeballs of the human body and w≤32.5 mm, and k is a viewpoint density to be reached and k≤10 mm; and the total quantity of viewpoints of the three-dimensional display device is N, and $N = N_1 \times N_2$.

4. The three-dimensional display device according to claim 1, wherein the width D, in the row direction, of the orthographic projection of each of the light splitting structures on the plane where the display panel is located meets a following formula:

$$D \leq 2L \times \tan\left(\frac{\pi}{180} \times \frac{1}{60} \times \frac{1}{2}\right).$$

5. The three-dimensional display device according to claim 1, wherein the width D, in the row direction, of the orthographic projection of each of the light splitting structures on the plane where the display panel is located meets the following formula:

$$D \geq \frac{hQ}{L},$$

wherein Q is a minimum viewable width which the three-dimensional display device will reach.

6. The three-dimensional display device according to claim 1, wherein a ratio of the width D, in the row direction, of the orthographic projection of each of the light splitting structures to the vertical distance h from the pixel to the light splitting structure is in a range of 0.1-0.5.

7. The three-dimensional display device according to a claim 1, wherein the plurality of light splitting structures extend in a direction forming an acute angle with the column direction.

8. The three-dimensional display device according to claim 7, wherein an included angle θ is formed between the extension direction of the light splitting structures and the column direction and meets a following formula:

$$\tan\theta = \frac{M}{N_2 \times K},$$

wherein K is a ratio of a size of the pixel in the column direction to the size of the pixel in the row direction, M≥1, M is an integer, and a greatest common divisor of M and $N_2$ is 1, 5°≤θ≤16°.

9. The three-dimensional display device according to claim 8, wherein the K is 3, wherein $N_1$ is 14, $N_2$ is 2, and θ is 9.46°; or $N_1$ is 9, $N_2$ is 3, and θ is 15.5°; or $N_1$ is 8, $N_2$ is 2, and θ is 9.46°.

10. The three-dimensional display device according to claim 9, wherein each row of pixels in a same pixel repeating unit are staggered by a length of one pixel in sequence in the row direction; in response to $N_2$ being 2, adjacent rows of pixels in two pixel repeating units continuously arranged in the extension direction within each of the light splitting structures are aligned in the column direction; and in response to $N_2$ being 3, adjacent rows of pixels in a $2n^{th}$ pixel repeating unit and a $2n-1^{th}$ pixel repeating unit in the extension direction within each of the light splitting structures are staggered by a length of one pixel in the row direction, adjacent rows of pixels in the $2n^{th}$ pixel repeating unit and a $2n+1^{th}$ pixel repeating unit are aligned in the column direction, n≥1, and n is an integer.

11. The three-dimensional display device according to claim 1, wherein each of the light splitting structures is a cylindrical lens.

12. The three-dimensional display device according to claim 1, wherein the light splitting assembly comprises a plurality of light blocking strips and a plurality of light transmitting strips, the light blocking strips and the light transmitting strips are arranged alternately in sequence in the row direction; and
each of the light splitting structures comprises one light transmitting strip and two halves of light blocking strip, the two halves of light blocking strip are located on two sides of the light transmitting strip.

13. The three-dimensional display device according to claim 12, wherein a width a of the light transmitting strip in the row direction meets a following formula:

$$a = \frac{w \times Px}{w + Px}.$$

14. The three-dimensional display device according to claim 1, wherein each of the plurality of pixels is a sub-pixel, and the plurality of pixels comprise: red sub-pixels, green sub-pixels and blue sub-pixels, the red sub-pixels, the green sub-pixels and the blue sub-pixels are arranged circularly in sequence in the row direction.

15. The three-dimensional display device according to claim 1, wherein the pixels covered by two adjacent light splitting structures comprise a first partition and a second partition, wherein
the first partition is covered by one of the two light splitting structures, the second partition is covered by the other light splitting structure, and an area of the first partition is smaller than an area of the second partition; and
the display panel further comprises a black matrix, and the black matrix covers the first partition and does not overlap with the second partition.

16. A driving method for the three-dimensional display device according to claim 1, comprising:
determining an image driving signal corresponding to each viewpoint according to an image information; and
applying the image driving signal corresponding to a same viewpoint to pixels at a same position in different pixel repeating units so as to form a three-dimensional image having a plurality of viewpoints, and a horizontal interval w is formed between viewpoints to which two adjacent pixels in the row direction in each pixel repeating unit correspond and meets a following formula:

$$w = \frac{E}{n},$$

wherein E is a distance between two eyeballs of a human body, and n≥2.

17. The driving method according to claim 16, after forming the three-dimensional image having the plurality of viewpoints, further comprising:
making three pixels of different light-emitting colors at the same viewpoint in three pixel repeating units continuously arranged in an extension direction within each of light splitting structures serve as a three-dimensional image driving unit to perform color fusion so as to form a multi-view three-dimensional image without a color shift.

18. A manufacturing method for the three-dimensional display device according to claim 1, comprising:
manufacturing a light splitting assembly having a plurality of light splitting structures and a display panel having a plurality of pixels sequentially arranged in a row direction and a column direction;
placing the light splitting assembly vertically along an extension direction of each of the light splitting structures, cutting the light splitting assembly according to a preset size respectively in directions forming a first included angle and a second included angle with a horizontal direction so as to obtain the plurality of light splitting structures arranged in the horizontal direction and forming the first included angle with a vertical direction, wherein a sum of the first included angle and the second included angle is 90°; and
laying of the plurality of light splitting structures on a display side of the display panel so as to obtain the three-dimensional display device.

19. The manufacturing method according to claim 18, wherein the manufacturing the light splitting assembly comprising the plurality of light splitting structures comprises:
forming a first resin layer on a substrate;
forming a plurality of cylindrical lenses on the first resin layer in a reel-to-reel nano-imprinting mode; and
forming a second resin layer on the plurality of cylindrical lenses, wherein a thickness of the second resin layer is greater than an arch height of each of the cylindrical lenses in a direction perpendicular to the substrate;
wherein a refraction index of the first resin layer is greater than a refraction index of the second resin layer.

20. The manufacturing method according to claim 18, after placing the light splitting assembly vertically along the extension direction of each of the light splitting structures and before cutting the light splitting assembly according to the preset size respectively in the directions forming the first included angle and the second included angle with the horizontal direction, further comprising:
adjusting alignment of a space glass and the light splitting structures so that the space glass and the light splitting structures are fixed after the space glass and the light splitting structures are placed in the second included angle, wherein the space glass is arranged between the display panel and the light splitting structures; and
laying the plurality of light splitting structures on the display side of the display panel comprises:
laying one side, having the space glass, of the plurality of light splitting structures on the display side of the display panel.

* * * * *